Nov. 14, 1933.  E. R. VAUGHN  1,935,488
WHEEL CONSTRUCTION
Original Filed Feb. 2, 1931    2 Sheets-Sheet 1
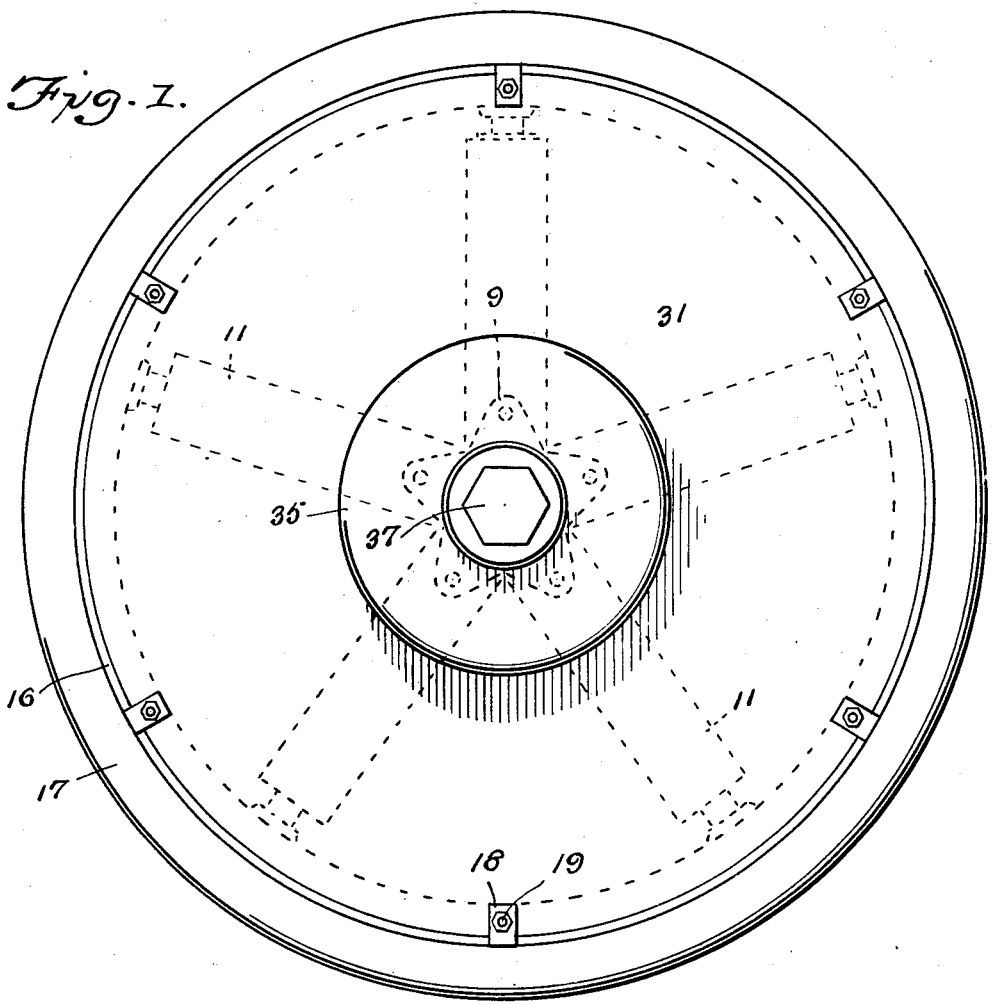
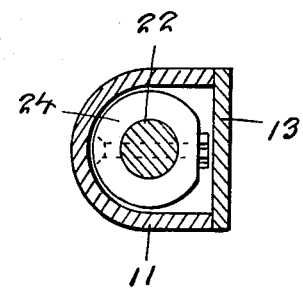

Nov. 14, 1933.            E. R. VAUGHN                1,935,488
                         WHEEL CONSTRUCTION
              Original Filed Feb. 2, 1931    2 Sheets-Sheet 2

E. R. Vaughn
INVENTOR

Patented Nov. 14, 1933

1,935,488

UNITED STATES PATENT OFFICE 1,935,488

WHEEL CONSTRUCTION

Edwin R. Vaughn, Honesdale, Pa.

Application February 2, 1931, Serial No. 512,963
Renewed February 9, 1933

1 Claim. (Cl. 152—47)

The invention relates to a wheel construction simulating disk wheels for use on trucks and pleasure cars.

The primary object of the invention is the provision of a wheel construction, wherein the tired rim is of the cushioned style and is supported from the hub by a series of spokes, these being resiliently made up, so that the wheel in its travel will absorb shocks and jars incident thereto, and the spoke arrangement is of a three point contact between the hub and the rim, so that the wheel will be sturdy to withstand excessive shocks and jars to relieve the same from the body of the vehicle, either truck or pleasure car, and in the use of the wheel, it will be protected from dirt and other matter.

Another object of the invention is the provision of a wheel construction of this character, wherein the springs associated with the spokes are housed so that grease can be packed therein to assure full and proper lubrication and thus giving longevity to the wheel, the outside and inside of the latter being protected by cover plates which give appearance of a disk wheel, the wheels being constructed in a novel manner to assure maximum resiliency, without the use of a pneumatic tire.

With the foregoing and other objects in view, the invention consists in the features of construction, combination and arrangement of parts, as will be hereinafter more fully described in detail, illustrated in the accompanying drawings which disclose the preferred embodiment of the invention, and pointed out in the claim hereunto appended.

In the accompanying drawings:—

Figure 1 is an elevation of the wheel construction in accordance with the invention and looking toward the outside thereof.

Figure 2 is an enlarged fragmentary vertical sectional elevation thereof.

Figure 3 is a sectional view taken approximately on the line 3—3 of Figure 2, looking in the direction of the arrows.

Figure 4 is a sectional view on the line 4—4 of Figure 3.

Similar reference characters indicate corresponding parts throughout the several views in the drawings.

Referring to the drawings in detail, the wheel construction comprises a hub 5, which in this instance is of cylindrical form and is removably fitted upon an axle spindle 6 having between it and said hub the usual bearing balls 7, the said hub being retained upon the spindle in the usual well known manner by means of a nut 8 upon the axle spindle.

Formed externally upon the hub 5 are spaced opposed pairs of radially extended lugs 9, these pairs of lugs being located outwardly and inwardly in spaced relation circumferentially of the said hub and between each outer and inner pair of said lugs is arranged the pivot terminals 10 of the forked inner end of a spoke housing 11, these terminals 10 being swingably connected with the lugs 9 through the medium of cross pivots 12 which are made fast in the lugs 9. The spoke housing 11 has a removable front plate 13 so that access can be had to the interior of said housing and said plate is secured by a fastener 14.

Disposed about the hub 5 concentrically thereto is an annular felly 15 carrying a demountable rim 16 supporting a solid resilient or cushion tire 17 of any standard make, the rim 16 being made fast upon the felly through the medium of the ordinary rim lugs 18 and lug bolts 19. Carried at the inner face of the felly 15 and confronting the outer end of the spoke housings 11 are spaced inner and outer pivot lugs 20 between each pair of which is arranged a rocker head 21 in which is detachably threaded a spoke 22, which is of rod formation and is slidably extended through the spoke housing 11, working through suitable openings at the inner and outer ends of the latter, these openings being fitted with felt washers 23 snugly embracing the spoke 22 to retain lubricant when packed within the housing 11. Engaged about the spoke 22, at an intermediate point of the housing 11, is a collar 24, while located on opposite sides of this collar, working against the same and surrounding said spoke 22, are coiled outer and inner compression springs 25 and 26 respectively, these working against the respective ends of said housing 11, and serve to absorb shocks and jars incident to the travel of the wheel on displacement of the spoke. It will be observed that by the assemblage of the spokes 22 in the wheel construction, there is a three point contact between the felly 15 and the hub throughout the location of the respective spokes.

The head 21 of each spoke 22 is connected with the lugs 20 through the medium of a pivot 26' and these lugs 20, as well as the terminals 10, are provided with suitable oil passages 27 and 28 for permitting lubrication of the pivots at these points.

The hub 5, at its inner end portion, carries a brake drum 29 and suitably made fast to outer and inner peripheral flanges 30 on the felly 15 are outer and inner disk-cover plates 31 and 32 respectively, these having open centers concentrically of the hub 5, the edges of the open center being curved outwardly to provide outside and inside dirt traps or channels 33 and 34 respectively, each being annular and unbroken, so that dirt will be caught therein from the upper half of the wheel at the outside faces of the disk or cover plates 31 and 32 and discharge from the traps or channels from the lower half of the wheel during travel of the latter and thereby excluding such dirt and foreign matter from the interior of the wheel construction.

Mounted on the outside end portion of the hub 5 and also upon the brake drum 29 are outside and inside dished guards 35 and 36 respectively which overhang the traps or channels 33 and 34 with the required clearance between said guards and the outer faces of the cover plates 31 and 32, the hub 5 being suitably fitted with a hub cap 37.

It will be apparent that the wheel construction will be possessed of maximum resilient qualities so as to absorb shocks and jars incident to the travel thereof and to relieve the vehicle from undue strains and stresses and maintain easy riding qualities thereto.

It is, of course, to be understood that changes, variations and modifications may be made in the invention, without departing from the spirit or sacrificing any of its advantages as fall properly within the scope of the claim hereunto appended.

What is claimed is:—

A wheel construction comprising a hub, a felly about the same, tubular housings disposed radially between the hub and felly, pivot connections between the hub and housings to space the same from said hub, each housing having centrally perforated ends, spokes pivoted to the felly and snugly working through the perforated ends of the housings, pistons on the spokes, compression springs in the housings at opposite sides of the pistons, and packings on the ends of the housings and snugly embracing the spokes externally of said housings, said housings at their outer sides having removable sections.

EDWIN R. VAUGHN.